June 18, 1935.   J. F. STEPHENS   2,005,056
PIPE COUPLING
Filed May 26, 1934   2 Sheets-Sheet 1
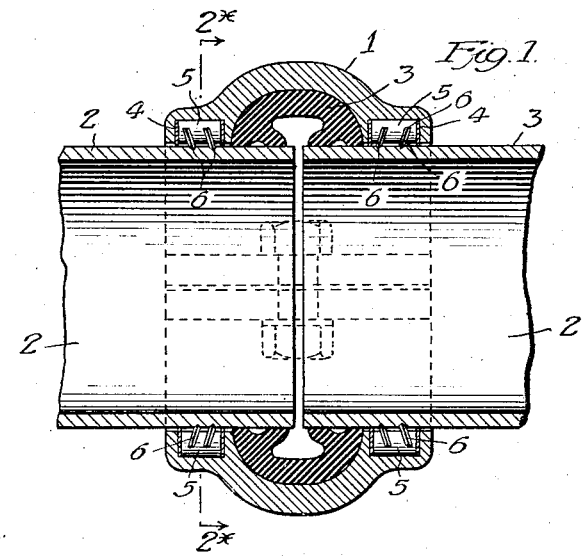
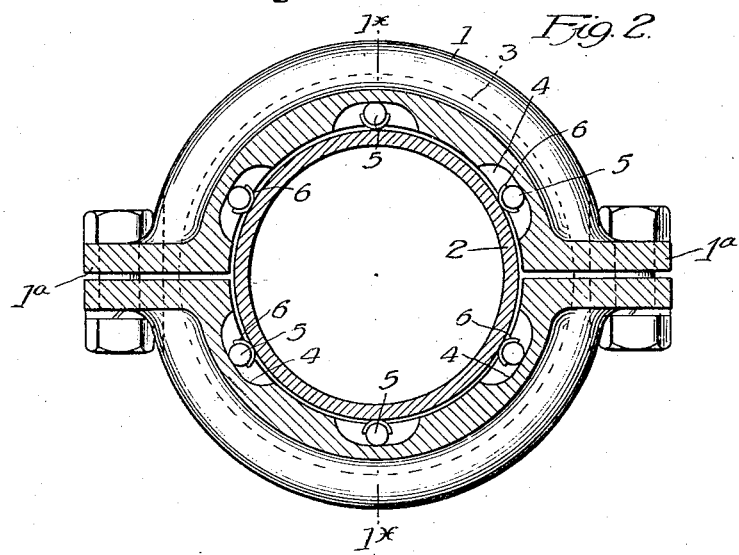
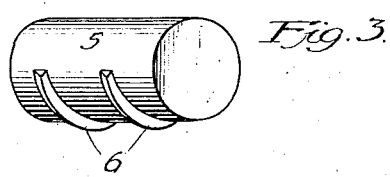
Witness:
R. B. Davison
Inventor:
Joseph F. Stephens
By Wilkinson Huxley Byron & Knight
Attys.

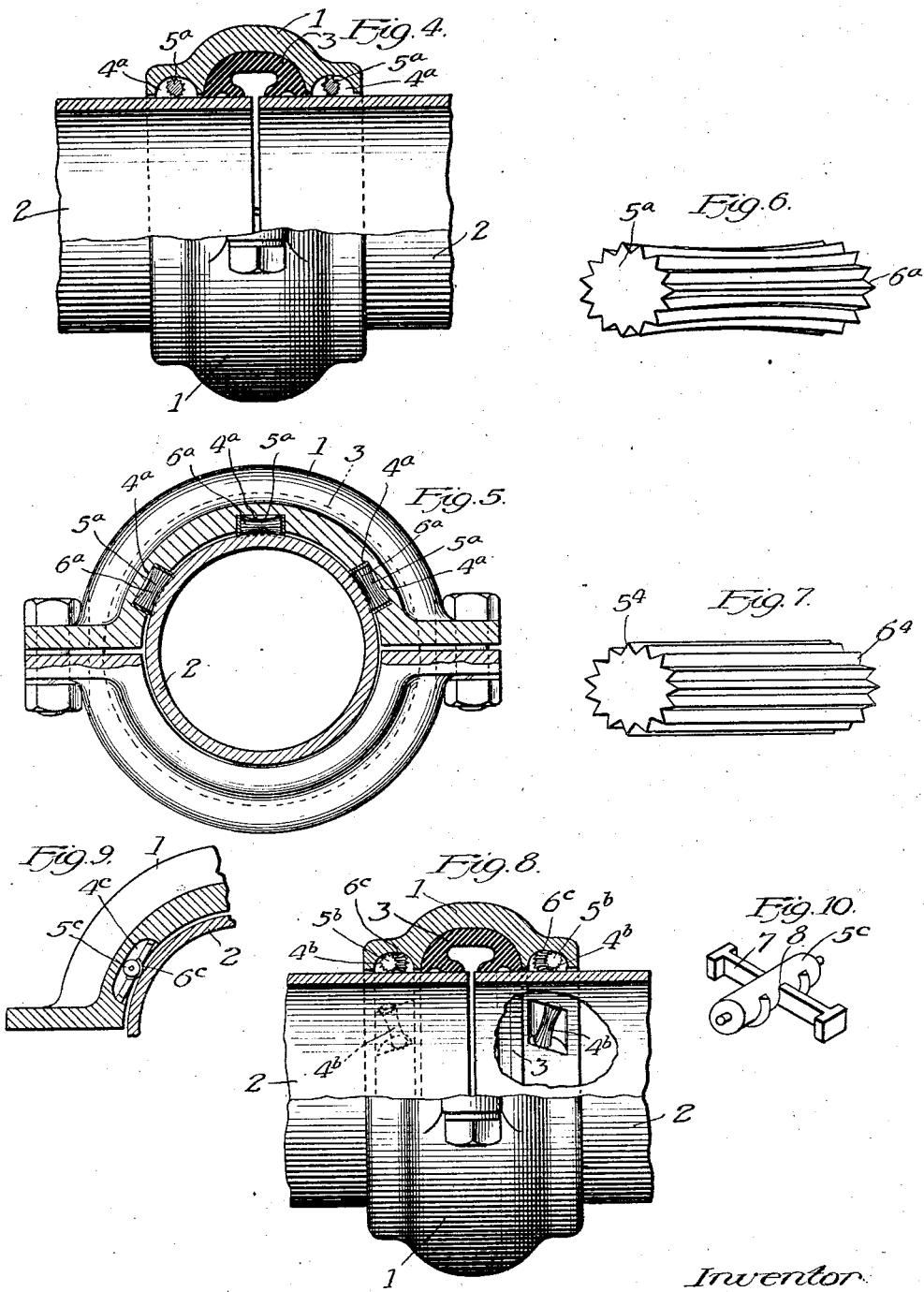

Patented June 18, 1935

2,005,056

UNITED STATES PATENT OFFICE 2,005,056

PIPE COUPLING

Joseph F. Stephens, Kansas City, Mo., assignor to Gustin-Bacon Manufacturing Co., Kansas City, Mo., a corporation of Missouri Application May 26, 1934, Serial No. 727,596

6 Claims. (Cl. 285—194)

This invention relates to pipe couplings of a type which, while employing a housing that receives and effects a non-leaking closure between the opposed ends of two pipe sections inserted therein, is unthreaded in its relation to the pipe sections in order to permit the latter to slide therein under displacing influences of minor amplitude, such as expansion and contraction in response to heat and cold, but adapted to resist displacement of the housing through distances that might be sufficient to defeat the functional relation of the packing and pipe ends.

Heretofore, it has been proposed to introduce between the marginal portions of a pipe-receiving housing and the ends of pipe sections inserted therein, gripping elements in the nature of ribbed or toothed calks which, while embedding themselves into the surface of the pipe under the clamping force applied to the assembly of the sectional housing and thereby rendering themselves immovable relatively to the gripped pipe, could nevertheless yield to minor relative axial movements between the housing and the pipe sections imposed by expansion and contraction due to changes in temperature. But to permit this relative axial movement between pipe and housing, lost motion was provided between the gripping elements and the housing, and there was no definite means for justifying the packing member of the housing relatively to the space between the opposed ends of the pipe.

The present invention provides means for determining, at will, the initial position of the coupling relatively to the opposed pipe ends and permanently maintaining this relative position against ordinary forces of material amplitude which tend to displace the coupling, but without defeating forces of large power but minor amplitude developed by expansion and contraction under changes in temperature. This is accomplished by having the gripping elements which anchor the coupling member on a pipe member, interengage with both of said members without material lost motion, in the direction of the axis of the joint, on either of said members; the gripping elements being snugly seated in one of said members, preferably the coupling, and carrying teeth penetrating the other of said members, preferably the pipe; also by having the teeth so designed that stresses axial of the joint will be translated into thrust substantially circumferentially of the gripping elements; also by rendering the gripping elements responsive to those circumferential thrusts only with substantial resistance thereto; and by having this resistance less than the expansion and contraction forces of unobjectionable amplitude but greater than casual forces which threaten displacements of objectionable amplitude.

In one of its aspects, the invention contemplates toothed rotary gripping elements pocketed without substantial lost motion in one of the interlocked members and having teeth through which they embed themselves in the other of said members, thereby holding all the members against relative axial movement; the teeth being positioned so that they present themselves to the member in which they are embedded with an angle of incidence to the displacing force that converts the force to a direction at a large angle to the said axis of the rotary element; while in another aspect, the invention contemplates having these gripping elements circular in section and rotatable in both directions in response to energy translated through their embedding teeth; the resistance to such movement being of an order that substantially resists movement of pipe sections of sufficiently large amplitude to be undesirable (usually of relatively low force) and yields to movements of small amplitude but materially higher force such as would be generated by expansion and contraction under changes in temperature.

In the accompanying drawings, in which several embodiments of the invention are shown by way of illustration—

Figure 1 is an axial section through a pipe coupling embodying one form of the invention, the plane of section being indicated by the line $1x$—$1x$ of Figure 2.

Figure 2 is a section on the line $2x$—$2x$ of Figure 1.

Figure 3 is a detail perspective view of one of the gripping elements employed in Figures 1 and 2.

Figure 4 is a view, partly in axial section and partly in elevation, showing another form of the invention.

Figure 5 is a view, partly in transverse section and partly in end elevation, of the form of the invention shown in Figure 4.

Figure 6 is a detailed perspective view of one of the rotary gripping elements employed in Figures 4 and 5.

Figure 7 is a modified form of gripping element which could be employed in Figures 4 and 5, with appropriate designing of the gripper pockets to receive it, in which case the gripping element would present its embedding projections tangentially to the surface of the pipe.

Figure 8 is a view, partly in axial section and partly in side elevation, showing the positioning of the gripping rollers of Figure 6 at a substantial angle to both the axis and the transverse plane of the coupling; and Figures 9 and 10 are views illustrating means through which to initially position a gripping element in a housing pocket.

Referring to Figures 1 to 3, inclusive, 1 represents the housing of a coupling, preferably diametrically subdivided and united by bolting lugs 1a, adapted to receive the opposed ends of two pipe sections 2, 2, and designed to mount, in sealing relation to the opposed ends of said pipe section, a gasket 3 which may be of known design. Located at the axial margins of the housing 1 are pockets 4 designed to receive gripping elements 5 constructed on at least a portion of their peripheries with embedding projections 6 through means of which the gripping elements impinge against the surfaces of the introduced pipe. These embedding projections have substantial dimensions in the direction of the circumference of the gripping elements but are in planes at a substantial angle to both the axis and the transverse plane of the coupling, so that while these gripping elements are held against axial movement relatively to the housing, they are movable relatively to the pipe in the rotary direction and in response to temperature movements of the pipe so that the pipe acts upon them after the manner of a cam or high pitch screw thread. But the planes of these embedding projections are at such a substantial angle to the axis of the coupling as to resist other displacing forces imposed upon the housing of any such order as will be encountered in service, and hence the housing remains sufficiently close to the position in which it is initially set to maintain at all times an effective sealing of the space between the pipe ends.

As shown in Figure 2, the portions of the gripping elements 5 through which they receive the pressure of the housing are preferably cylindrical and the pockets 4 have substantial dimensions in the direction of the circumference of the housing, so that the gripping elements may roll therein and thus avoid too great a sluggishness or resistance to the camming action of the pipe; but the rolling surfaces of these pockets are such that, after predetermined rotational movement of the gripping elements, they begin to impose an increased pressure upon the gripping elements.

According to Figures 4 and 5, the gripping elements 5a are normal to the axis of the coupling; the pockets 4a that receive them fit the gripping elements in the circumferential direction of the coupling but are enlarged in the direction of the axis of the coupling so that the gripping elements may roll under the temperature movements of the pipe. But the peripheral embedding projections 6a are such that there is sufficient resistance to the rotation of these gripping elements 5a, due to the necessity of intruding their ribs or projections deeply into the metal of the housing as well as the surface of the pipe; and thus, while the gripping elements are displaceable and rotatable relatively to the pipe under temperature movements of the latter, there is ample resistance to any displacing influences normally encountered by the housing in use.

As suggested in Figure 7, the gripping elements 5x can be made with straight rather than concave sides, provided the pockets 4a are similarly designed; and in this instance the gripping elements would impinge tangentially against the periphery of the pipe through means of embedding projections 6x.

In Figure 8, the gripping elements 5b are comparable in design to those shown at 5a, but their position relatively to the housing and the pipe is comparable to that of the circumferential embedding projections 6 in Figures 1 and 2; that is to say, the axes of the gripping elements in this instance, having embedding projections parallel with their axes, are at an angle to both the axis of the coupling and the transverse plane thereof, thus developing rotary motion in the gripping elements from temperature movements of the pipe on the principle of the camming or high pitch screw action described in connnection with Figures 1 and 2.

In the form shown in Figures 4 and 5, as well as that shown in Figure 8, tolerance is provided in the pockets 4a and 4b for bodily displacement of the gripping elements under their rotary movement, for reasons already described in connection with Figures 1 and 2.

According to Figures 9 and 10, a gripping element 5c may, if desired, be positioned in its pocket in the housing initially with its impinging and embedding projections 6c in a medial position relative to the surface of the pipe so that it will be prepared to rotate in either direction; and the means for so positioning the gripping element may be a bar 7 entering as a strut across the pocket 4c and projecting through a positioning groove 8 formed in the element 5c to receive it. Said positioning means is preferably made of some material that will yield under displacing movement of the gripping element; for instance, it may be of rubber or any other yieldable material, or even a material that is destroyed by movement of the gripping element, inasmuch as its function is ended when the parts are initially assembled.

What is claimed is:

1. In a pipe joint, a coupling member constructed to receive the end of a pipe member, and a gripping element of circular section rotatably confined between said members and having its circular surface in positive bearing upon both; said gripping element having upon its said surface means through which it interengages with at least one of said members, positioned to translate a force in the direction of the axis of the joint into a rotation of the circular surface in contact with both members, thereby rendering said gripping element sluggishly rotatable in response to said force.

2. A pipe joint as described in claim 1, in which the rotation of the gripping element in response to thrust derived from an axial force in the joint, is about an axis in a plane at a substantial angle to the axis of the joint.

3. A pipe joint as described in claim 1 in which the gripping element is confined in one of the joint members and the means through which it interengages with the other of said members comprises teeth penetrating the said other member.

4. In a pipe coupling, a housing constructed to receive the end of a pipe which is to be coupled and having a recess presented toward the pipe, and a gripping element mounted in said recess in position to impinge against the inserted pipe; said gripping element being rotatable relatively to both the inserted pipe and the housing, in response to relative axial movement between said pipe and housing; and the housing recess having a surface through which it receives the gripping element which opposes the rotation of the gripping element relatively thereto and thereby renders sluggish the movement of the gripping element by the pipe.

5. In a pipe coupling, a housing, a pipe received therein, and a gripping element through which the housing embraces the pipe; said gripping element having toothed surfaces through which it is in impingement against both the housing and the pipe whereby it is rotarily displaced by relative axial movement between the housing and the pipe; and the housing having a surface through which it impinges the rotating surface of the gripping element and imposes resistance against rotary movement of the gripping element.

6. In a pipe coupling, a housing adapted to receive the end of a pipe, and a cylindrical gripping element through which the housing embraces the pipe, rotarily displaceable under thrust of the pipe in the housing and having upon its periphery embedding ribs through which it impinges against the pipe; said housing having a surface through which it also engages the ribbed surface of the gripping element in the rotary movement induced by the thrust of the pipe.

JOSEPH F. STEPHENS.